US012763262B2

(12) United States Patent
Han

(10) Patent No.: US 12,763,262 B2
(45) Date of Patent: Oct. 13, 2026

(54) THIN-FILM SUBSTRATE AND ENERGY-SENSITIVE ELECTRONIC COMPONENT INCLUDING SAME

(71) Applicant: VANAM INC., Seoul (KR)

(72) Inventor: Soo Deok Han, Seoul (KR)

(73) Assignee: VANAM INC., Seoul (KR)

( * ) Notice: Subject to any disclaimer, the term of this patent is extended or adjusted under 35 U.S.C. 154(b) by 474 days.

(21) Appl. No.: 18/282,962

(22) PCT Filed: Jul. 21, 2023

(86) PCT No.: PCT/KR2023/010601

§ 371 (c)(1),
(2) Date: Sep. 19, 2023

(87) PCT Pub. No.: WO2024/049002

PCT Pub. Date: Mar. 7, 2024

(65) Prior Publication Data

US 2024/0234037 A1 Jul. 11, 2024

(30) Foreign Application Priority Data

Aug. 30, 2022 (KR) ........................ 10-2022-0108963

(51) Int. Cl.
*H01G 4/33* (2006.01)
*H01G 4/008* (2006.01)
(Continued)

(52) U.S. Cl.
CPC ............... *H01G 4/33* (2013.01); *H01G 4/008* (2013.01); *H01G 4/012* (2013.01); *H01G 4/1218* (2013.01)

(58) Field of Classification Search
CPC . H01C 1/142; H01C 7/04; H01C 7/10; H01C 17/075
See application file for complete search history.

(56) References Cited

U.S. PATENT DOCUMENTS

2003/0172522 A1* 9/2003 Tanimura ............. H01C 17/281 29/610.1
2010/0001828 A1* 1/2010 Mihara ............... C04B 35/4682 338/22 SD (Continued)

FOREIGN PATENT DOCUMENTS

EP 3822668 A1 * 5/2021 ............. G02B 5/008
EP 3621802 B1 * 7/2024 ........... H03K 17/687
WO WO-2012002764 A2 * 1/2012 ............. H01L 23/62

*Primary Examiner* — Kyung S Lee
(74) *Attorney, Agent, or Firm* — Bridgeway IP Law Group, PLLC; Sang Ho Lee; Hyun Woo Shin

(57) ABSTRACT

A thin-film substrate includes an $Al_2O_3$ single crystal base substrate, and a $VO_2$ functional thin film disposed on the base substrate and doped with Ti, wherein, when R1 is a resistance at a temperature of 25° C. and R2 is a resistance at a temperature of 80° C., the functional thin film has an R1/R2 of $10^4$ or more, and when a heating process from 25° C. to 80° C. and a cooling process from 80° C. to 25° C. are referred to as one cycle, a variation ($V_{\Delta T}$) in hysteresis temperature difference ($\Delta T$) of the functional thin film during 10 cycles may be 1° C. or lower, a variation ($V_{TMI}$) in phase transition temperature ($T_{MI}$) of the functional thin film during 10 cycles may be 1.5° C. or lower, and a variation rate ($V_{R1/R2}$) of R1/R2 of the functional thin film during 10 cycles may be 5% or less.

10 Claims, 10 Drawing Sheets

I - I'

A

(51) Int. Cl.
*H01G 4/012* (2006.01)
*H01G 4/12* (2006.01)

(56) References Cited

U.S. PATENT DOCUMENTS

| | | | | |
|---|---|---|---|---|
| 2014/0085044 | A1 * | 3/2014 | Hirose | H01C 17/12 338/314 |
| 2014/0266391 | A1 * | 9/2014 | Parkin | H10N 99/03 327/365 |
| 2016/0247610 | A1 * | 8/2016 | Shinoura | H01C 1/142 |
| 2019/0040520 | A1 * | 2/2019 | Krammer | F24S 70/30 |

* cited by examiner

THIN-FILM SUBSTRATE AND ENERGY-SENSITIVE ELECTRONIC COMPONENT INCLUDING SAME

CROSS REFERENCE TO THE RELATED APPLICATIONS

This application is a national phase entry of PCT/KR2023/010601, filed Jul. 21, 2023, which claims priority to Korean Patent Application No. 10-2022-0108963, filed Aug. 30, 2022, the entire disclosure of which are incorporated by reference herein.

TECHNICAL FIELD

The present invention relates to a thin-film substrate and an energy-sensitive electronic component including the same.

BACKGROUND ART

With the advent of the Internet of Things (IoT) era, almost all things are becoming electronic devices. Thus, various electronic components such as transistors, diodes, memories, sensors, and capacitors are being miniaturized with higher performance, and a larger number of electronic components are being integrated into electronic devices.

Meanwhile, electronic devices including a larger number of higher-performance electronic components may be more vulnerable to abnormal internal and external stimuli such as overheating, overcurrent, and overvoltage. In order to solve such problems, it may be considered to integrate a surge protection module into an electronic device.

From this point of view, interest in semiconductor materials that cause a metal-insulator transition (MIT) phenomenon in which a metallic state is changed to an insulating state, which is induced by an external energy stimulus, is increasing.

Among the semiconductor materials, vanadium dioxide ($VO_2$) is known to exhibit a phase transition phenomenon at a temperature close to room temperature (about 67° C.) at a very high speed (within a femto second $10^{-15}$). $VO_2$ has great potential for applications in sensing, switching, and especially surge protection, in that it reacts sensitively and quickly to various energies such as heat, electricity, and light.

Since single crystal bulk $VO_2$ is rapidly destroyed within several cycles accompanied by structural transformation and distortion during phase transition, there may be limitations in using single crystal bulk $VO_2$ in the above-described applications. Therefore, for reliability such as repeatability and stability, a high-quality $VO_2$ thin film should be formed.

In order for the $VO_2$ thin film to have characteristics of high sensitivity and high reliability, a difference in electrical resistance R1/R2 between a metal phase and an insulating phase of the $VO_2$ thin film should be large, and a hysteresis temperature difference ΔT, which is a difference between a phase transition temperature in a heating process and a phase transition temperature in a cooling process, should be small.

DISCLOSURE

Technical Problem

The present invention is directed to providing an energy-sensitive electronic component with improved sensitivity.

The present invention is also directed to providing an energy-sensitive electronic component with improved accuracy.

The present invention is also directed to providing an energy-sensitive electronic component with improved reliability.

The present invention is also directed to providing a thin-film substrate with improved sensitivity.

The present invention is also directed to providing a thin-film substrate with improved accuracy.

The present invention is also directed to providing a thin-film substrate with improved reliability.

Technical Solution

One aspect of the present invention provides an energy-sensitive electronic component including an $Al_2O_3$ single crystal base substrate, a $VO_2$ functional thin film disposed on the base substrate and doped with Ti, and first and second outer electrodes disposed to be spaced apart from each other on the base substrate and/or the functional thin film and connected to the functional thin film, wherein, when R1 is a resistance at a temperature of 25° C. and R2 is a resistance at a temperature of 80° C., the functional thin film has an R1/R2 of $10^4$ or more, and when a heating process from 25° C. to 80° C. and a cooling process from 80° C. to 25° C. are referred to as one cycle, the functional thin film satisfies at least one among a) a variation ($V_{\Delta T}$) in hysteresis temperature difference (ΔT) during 10 cycles is 1° C. or lower, b) a variation ($V_{TMI}$) in phase transition temperature ($T_{MI}$) during 10 cycles is 1.5° C. or lower, and c) a variation rate ($V_{R1/R2}$) of R1/R2 during 10 cycles is 5% or less.

Each of the first and second outer electrodes may include a base resin and a conductive resin layer including conductive particles dispersed in the base resin, and the conductive particle may include at least one among platinum (Pt), gold (Au), chromium (Cr), molybdenum (Mo), nickel (Ni), titanium (Ti), silver (Ag), aluminum (Al), copper (Cu), iron (Fe), indium (In), tin (Sn), lead (Pb), palladium (Pd), zinc (Zn), and cobalt (Co).

The energy-sensitive electronic component may further include first and second lead thin films disposed between the functional thin film and each of the first and second outer electrodes to connect the first and second outer electrodes to the functional thin film.

Each of the first and second lead thin films may include at least one among Pt, Au, Cr, Mo, Ni, Ti, Ag, Al, Cu, Fe, In, Sn, Pb, Pd, Zn, and Co.

The functional thin film may have one surface in contact with the base substrate and the other surface facing the one surface, and the first and second lead thin films may be disposed to be spaced apart from each other on the other surface of the functional thin film.

At least a portion of the first outer electrode and at least a portion of the second outer electrode may be disposed to be spaced apart from each other on the other surface of the functional thin film so as to be in contact with the first and second lead thin films.

The first and second outer electrodes may extend to both end surfaces, which face each other, of the base substrate.

Another aspect of the present invention provides a thin-film substrate including an $Al_2O_3$ single crystal base substrate; and a $VO_2$ functional thin film disposed on the base substrate and doped with Ti, wherein, when R1 is a resistance at a temperature of 25° C. and R2 is a resistance at a temperature of 80° C., the functional thin film has an R1/R2 of $10^4$ or more, and when a heating process from 25° C. to 80° C. and a cooling process from 80° C. to 25° C. are referred to as one cycle, the functional thin film satisfies at least one among a) a variation ($V_{\Delta T}$) in hysteresis temperature difference (ΔT) during 10 cycles is 1° C. or lower, b) a variation ($V_{TMI}$) in phase transition temperature ($T_{MI}$) during 10 cycles is 1.5° C. or lower, and c) a variation rate ($V_{R1/R2}$) of R1/R2 during 10 cycles is 5% or less.

The thin-film substrate may further include first and second lead thin films disposed to be spaced apart from each other on the functional thin film and connected to the functional thin film.

Each of the first and second lead thin films may include at least one among platinum (Pt), gold (Au), chromium (Cr), molybdenum (Mo), nickel (Ni), titanium (Ti), silver (Ag), aluminum (Al), copper (Cu), iron (Fe), indium (In), tin (Sn), lead (Pb), palladium (Pd), zinc (Zn), and cobalt (Co).

Advantageous Effects

According to one embodiment of the present invention, the sensitivity of an energy-sensitive electronic component can be improved.

According to one embodiment of the present invention, the accuracy of an energy-sensitive electronic component can be improved.

According to one embodiment of the present invention, the reliability of an energy-sensitive electronic component can be improved.

According to another embodiment of the present invention, the sensitivity of a functional thin film can be improved.

According to another embodiment of the present invention, the accuracy of a functional thin film can be improved.

According to another embodiment of the present invention, the reliability of a functional thin film can be improved.

MODES OF THE INVENTION

Figure 1:
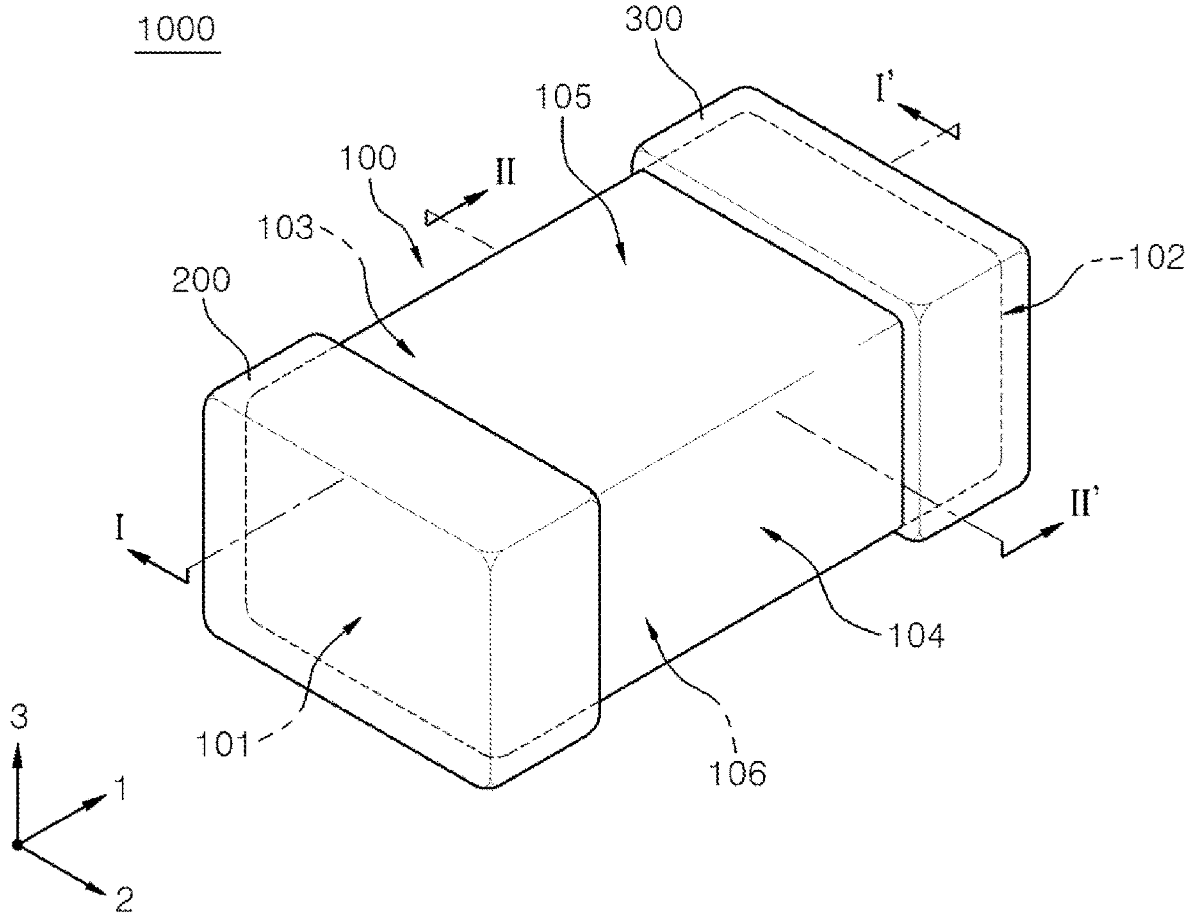
FIG. 1 is a schematic diagram illustrating an energy-sensitive electronic component according to one embodiment of the present invention.

Terms used herein are only employed to describe specific embodiments and are not intended to limit the present invention. Unless the context clearly dictates otherwise, the singular form includes the plural form. It should be understood that the terms "comprise," "include," and "have" specify the presence of stated herein features, numbers, steps, operations, components, elements, or combinations thereof but do not preclude the presence or addition of one or more other features, numbers, steps, operations, components, elements, or combinations thereof. In addition, throughout the present specification, the term "on" means to be located above or below a target portion and does not necessarily mean to be located on an upper side with respect to the direction of gravity.

In addition, the term "coupling" is used as a concept that encompasses a case of direct physical contact between components in a contact relationship therebetween and a case in which another component is interposed therebetween and thus the components are in contact with another component.

The size and thickness of each component shown in the drawings are arbitrarily illustrated for convenience of description, and thus the present invention is not necessarily limited to those shown in the drawings.

In the drawings, a first direction may be defined as an L direction or a length direction, a second direction as a W direction or a width direction, and a third direction as a T direction or a thickness direction.

Hereinafter, a thin-film substrate and an energy-sensitive electronic component according to embodiments of the present invention will be described in detail with reference to the accompanying drawings. In describing with reference to the accompanying drawings, the same or corresponding components are assigned the same reference numerals, and duplicate descriptions thereof will be omitted.

Various types of electronic components are used in electronic devices and various types of energy-sensitive electronic components may be appropriately used for the purpose of preventing overheating or overvoltage between these electronic components. The energy-sensitive electronic components may be, for example, thermistors that are thermal energy-sensitive electronic components and varistors that are electrical energy-sensitive electronic components and the like, and may be used to protect various electronic devices, various electronic components of electronic devices, and various electronic component modules.

In the present specification, the energy-sensitive electronic component may mean that electrical resistance of an electronic component changes according to variations in energy such as thermal energy, electrical energy, and light energy. However, hereinafter, for convenience of description, a description will be made on the premise that the electrical resistance of the energy-sensitive electronic component changes according to a variation in thermal energy, that is, a variation in temperature.

Figure 2:
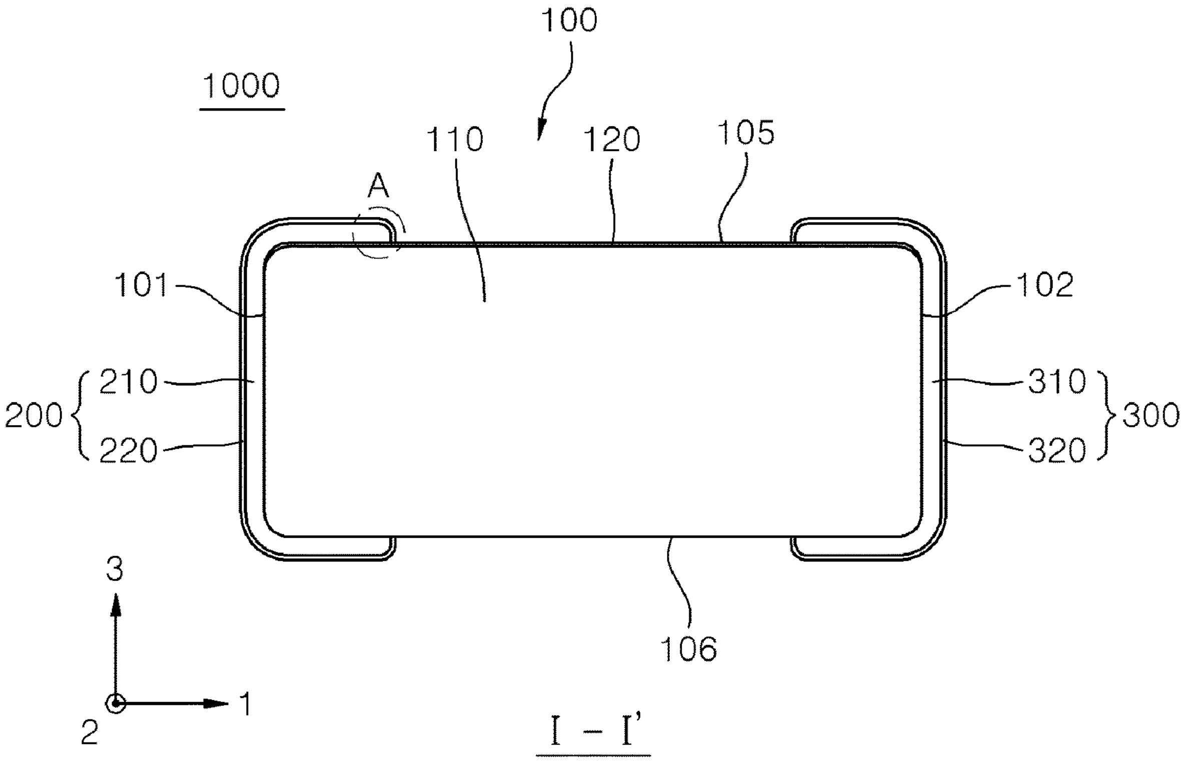
FIG. 2 is a cross-sectional view of the energy-sensitive electronic component along line I-I' of FIG. 1.
Figure 3:
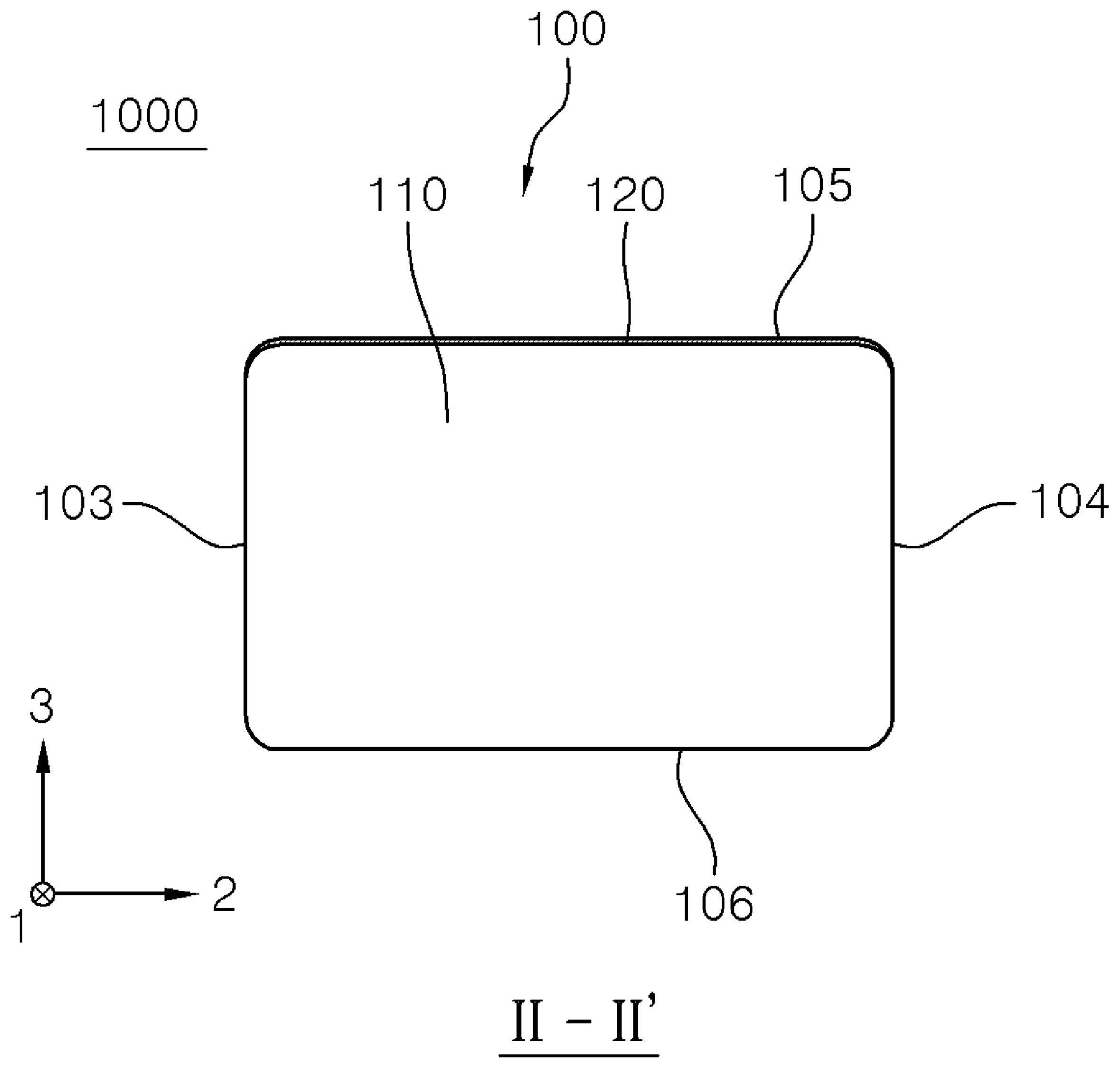
FIG. 3 is a cross-sectional view of the energy-sensitive electronic component along line II-II' of FIG. 1.
Figure 4:
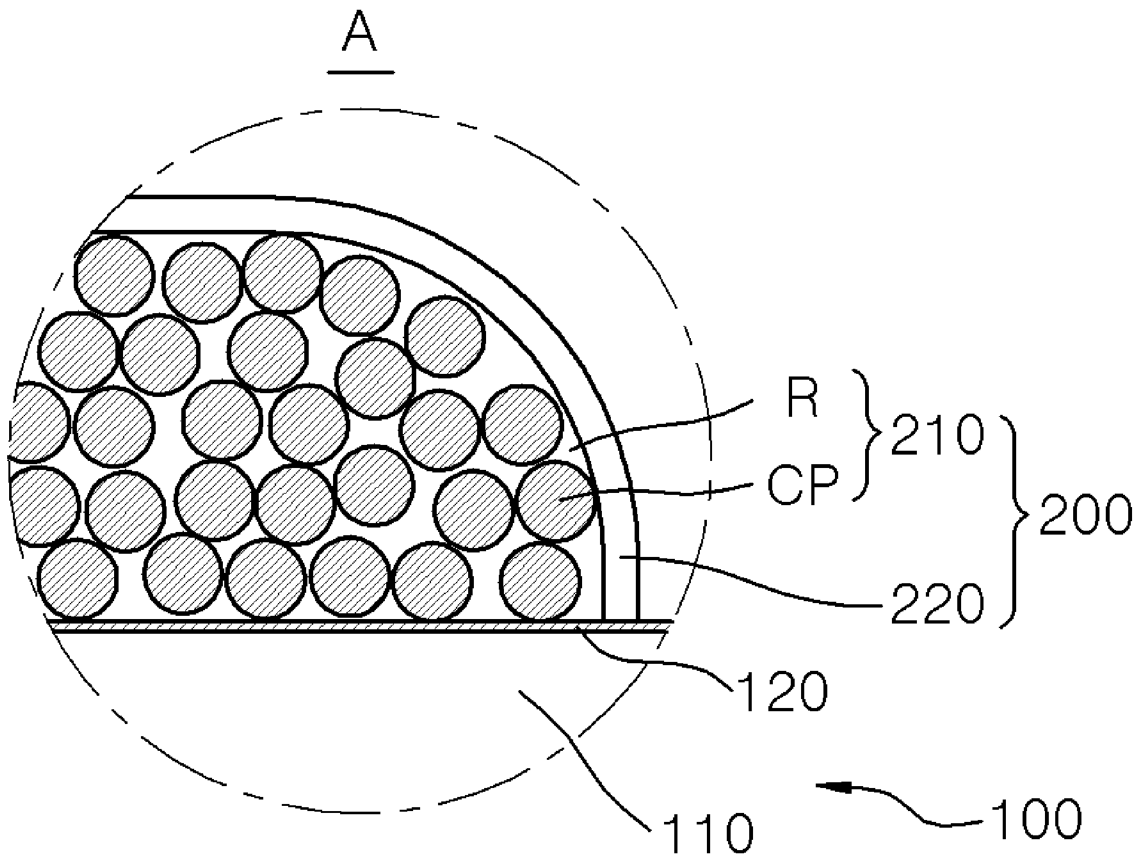
FIG. 4 is an enlarged view illustrating portion A of FIG. 2.

FIG. 1 is a schematic diagram illustrating an energy-sensitive electronic component according to one embodiment of the present invention. FIG. 2 is a cross-sectional view of the energy-sensitive electronic component along line I-I' of FIG. 1. FIG. 3 is a cross-sectional view of the energy-sensitive electronic component along line II-II' of FIG. 1. FIG. 4 is an enlarged view illustrating portion A of FIG. 2.

Referring to FIGS. 1 to 4, an electronic component 1000 according to one embodiment of the present invention includes a thin-film substrate 100, a first outer electrode 200, and a second outer electrode 300. The thin-film substrate 100 includes a base substrate 110 and a functional thin film 120. Hereinafter, for convenience of description, the "energy-sensitive electronic component 1000" is referred to as an "electronic component 1000."

The thin-film substrate 100 may form the overall exterior of the electronic component 1000 according to the present embodiment. The thin-film substrate 100 may be formed in a hexahedral shape as a whole. Hereinafter, the thin-film substrate 100 may be referred to as a body 100 in that it forms the overall exterior of the electronic component 1000 according to the present embodiment.

Based on FIGS. 1 to 3, the body 100 includes a first surface 101 and a second surface 102 facing each other in a first direction 1, a third surface 103 and a fourth surface 104 facing each other in a second direction 2, and a fifth surface 105 and a sixth surface 106 facing each other in a third direction 3. Each of the first to fourth surfaces 101, 102, 103, and 104 of the body 100 corresponds to a wall surface of the body 100 connecting the fifth surface 105 to the sixth surface 106 of the body 100. Hereinafter, both end surfaces (one end surface and the other end surface) of the body 100 may be the first surface 101 and the second surface 102 of the body 100, both side surfaces (one side surface and the other side surface) of the body 100 may be the third surface 103 and the fourth surface 104 of the body 100, and one surface and the other surface of the body 100 may be the sixth surface 106 and the fifth surface 105 of the body 100, respectively. Meanwhile, since the body 100 includes the base substrate 110 and the functional thin film 120 disposed on the base substrate 110, each of the first to fourth surfaces 101, 102, 103, and 104 of the body 100 may include the base substrate 100 and the functional thin film 120. In addition, the sixth surface 106 of the body 100 may actually include only the base substrate 100, and the fifth surface 105 of the body 100 may actually include only the functional thin film 120. When the electronic component 1000 according to the present embodiment is mounted on a mounting board such as a printed circuit board, the sixth surface 106 of the body 100 may be mounted to face an upper surface of the mounting board, or the fifth surface 105 of the body 100 may be mounted to face the upper surface of the mounting board.

For example, the body 100 may be formed such that the electronic component 1000 according to the present embodiment, in which the outer electrodes 200 and 300, which will be described below, are formed, is 7.4 mm long and 5.1 mm wide, 6.3 mm long and 3.2 mm wide, 5.0 mm long and 2.5 mm wide, 4.5 mm long and 3.2 mm wide, 4.5 mm long and 1.6 mm wide, 3.2 mm long and 2.5 mm wide, 3.2 mm long and 1.6 mm wide, 2.5 mm long and 2.0 mm wide, 2.0 mm long and 1.2 mm wide, 1.6 mm long and 0.8 mm wide, 1.0 mm long and 0.5 mm wide, 0.8 mm long and 0.4 mm wide, 0.6 mm long and 0.3 mm wide, or 0.6 mm long and 0.3 mm wide, but the present invention is not limited thereto. Meanwhile, since the above-described exemplary dimensions for the length and width of the electronic component 1000 are dimensions that do not reflect process errors, a dimension within a range, which can be recognized as a process error, should be regarded as corresponding to the above-described exemplary dimensions. In addition, since the body 100 of the electronic component 1000 may be formed by forming a functional thin film 120 on the base substrate 110 in a wafer state and then dicing the base substrate 110 in a wafer state, the length and width of the electronic component 1000 may be substantially the same as the length and width of the base substrate 110 and the length and width of the functional thin film 120.

Based on a photograph of an optical microscope or scanning electron microscope (SEM) for a cross section (cross section 1-3) of the electronic component 1000 taken in the first direction 1-third direction 3 at the center of the electronic component 1000 in the second direction 2, the length of the electronic component 1000 may be a maximum value among dimensions of a plurality of line segments parallel in the first direction 1 by connecting two boundary lines facing each other in the first direction 1 among outermost boundary lines of the electronic component 1000 shown in the photograph. Alternatively, the length of the electronic component 1000 may be a minimum value among dimensions of the plurality of line segments parallel in the first direction 1 by connecting two boundary lines facing each other in the first direction 1 among the outermost boundary lines of the electronic component 1000 shown in the photograph. Alternatively, the length of the electronic component 1000 may be an arithmetic average value among two or more dimensions of the plurality of line segments parallel in the first direction 1 by connecting two boundary lines facing each other in the first direction 1 among the outermost boundary lines of the electronic component 1000 shown in the photograph.

Based on a photograph of the optical microscope or SEM for a cross section (cross section 1-2) of the electronic component 1000 taken the first direction 1-second direction 2 at the center of the electronic component 1000 in the third direction 3, the width of the electronic component 1000 may be a maximum value among dimensions of a plurality of line segments parallel in the second direction 2 by connecting two boundary lines facing each other in the second direction 2 among outermost boundary lines of the electronic component 1000 shown in the photograph. Alternatively, the width of the electronic component 1000 may be a minimum value among dimensions of a plurality of line segments parallel in the second direction 2 by connecting two boundary lines facing each other in the second direction 2 among the outermost boundary lines of the electronic component 1000 shown in the photograph. Alternatively, the width of the electronic component 1000 may be an arithmetic average value among two or more dimensions of the plurality of line segments parallel in the second direction 2 by connecting two boundary lines facing each other in the second direction 2 among the outermost boundary lines of the electronic component 1000 shown in the photograph.

Based on the photograph of the optical microscope or SEM for the cross section (cross section 1-3) of the electronic component 1000 taken in the first direction 1-third direction 3 at the center of the electronic component 1000 in the second direction 2, a thickness of the electronic component 1000 may be a maximum value among dimensions of a plurality of line segments parallel in the third direction 3 by connecting two boundary lines facing each other in the third direction 3 among the outermost boundary lines of the electronic component 1000 shown in the photograph. Alternatively, the thickness of the electronic component 1000 may be a minimum value among dimensions of a plurality of line segments parallel in the third direction 3 by connecting two boundary lines facing each other in the third direction 3 among the outermost boundary lines of the electronic component 1000 shown in the photograph. Alternatively, the thickness of the electronic component 1000 may be an arithmetic average value among two or more dimensions of the plurality of line segments parallel in the third direction 3 by connecting two boundary lines facing each other in the third direction 3 among the outermost boundary lines of the electronic component 1000 shown in the photograph.

Alternatively, the length, width, and thickness of the electronic component 1000 may each be measured by a micrometer measurement method. In the micrometer measurement method, a zero point may be set using a micrometer with gage repeatability and reproducibility (R&R), the electronic component 1000 according to the present embodiment may be inserted between tips of the micrometer, and measurement may be performed by turning a measuring lever of the micrometer. Meanwhile, in measuring the length of the electronic component 1000 using the micrometer measurement method, the length of the electronic component 1000 may be a value measured once or may be an arithmetic average of values measured a plurality of times. The same may be applied to the measurement of the width and thickness of the electronic component 1000.

The body 100 includes a base substrate 110 and a functional thin film 120. Specifically, the body 100 includes the base substrate 110 and the functional thin film 120 disposed on one surface of the base substrate 110 (the upper surface of the base substrate 110 based on the directions of FIGS. 1 to 3).

The base substrate 110 may be a single crystal substrate. The base substrate 110 may be a substrate which is grown in one direction and has crystallinity. For example, the base substrate 110 may be an $Al_2O_3$ single crystal substrate, a Si single crystal substrate, a SiC single crystal substrate, a Ge single crystal substrate, a $TiO_2$ single crystal substrate, a ZnO single crystal substrate, a ZnS single crystal substrate, a ZnSe single crystal substrate, a ZnTe single crystal substrate, a CdS single crystal substrate, a CdSe single crystal substrate, a CdTe single crystal substrate, a GaAs single crystal substrate, a GaP single crystal substrate, a GaSb single crystal substrate, an InAs single crystal substrate, an InP single crystal substrate, a $SrTiO_3$ single crystal substrate, or a MgO single crystal substrate.

The functional thin film 120 may be a $VO_2$ thin film doped with Ti.

As a non-limiting example, the functional thin film 120 may be formed on the base substrate 110 by forming a $TiO_2$ sacrificial layer on the base substrate 110, forming a main oxide thin film layer of $VO_2$ on the sacrificial layer, and performing post thermal annealing on the sacrificial layer and the main oxide thin film layer.

Here, the sacrificial layer may be grown on the upper surface of the base substrate 110 in a predetermined direction in a crystal orientation of the base substrate 110. That is, the sacrificial layer may be pre-crystallized prior to forming the main oxide thin film layer. A thickness of the sacrificial layer may range, for example, from 1 nm to 50 nm, but the scope of the present invention is not limited thereto, and the thickness may be appropriately changed according to a designed Ti ion concentration in the functional thin film 120. The sacrificial layer may be formed through, for example, a thin film process such as physical vapor deposition (PECVD) including sputtering, pulsed laser deposition (PLD), or electron beam deposition, chemical vapor deposition (CVD) including plasma enhanced CVD (PECVD) and metal organic CVD (MOCVD), atomic layer deposition (ALD), or molecular beam epitaxy (MBE).

Here, the main oxide thin film layer may be crystallized or non-crystallized on the sacrificial layer in a predetermined direction according to the crystallization orientation of the sacrificial layer. When the post thermal annealing process is performed subsequently after the formation of the main oxide thin film layer, the main oxide thin film layer may be formed in an amorphous state on the sacrificial layer. A thickness of the main oxide thin film layer may range, for example, from 10 nm to 1000 nm, but the scope of the present invention is not limited thereto, and the thickness may be appropriately changed according to the designed Ti ion concentration in the functional thin film 120. The main oxide thin film layer may be formed through, for example, a thin film process such as physical vapor deposition (PECVD) including sputtering, PLD, or electron beam deposition, CVD including PECVD and MOCVD, ALD, or MBE.

Here, the post thermal annealing may be a process of integrating the sacrificial layer and the main oxide thin film layer. Specifically, the post thermal annealing may be an integration process of doping the main oxide thin film layer with a material constituting the sacrificial layer to remove a boundary between the sacrificial layer and the main oxide thin film layer. The post thermal annealing may be performed using a device such as, for example, a box furnace, a tube furnace, or a rapid thermal annealing (RTA) furnace. The post thermal annealing may be performed in an atmosphere of one or more of, for example, air, oxygen ($O_2$), nitrogen ($N_2$), argon (Ar), and hydrogen ($H_2$). The post thermal annealing may be performed in a temperature range of, for example, 400° C. to 800° C.

A crystal structure and an orientation of the functional thin film 120 formed through the post thermal annealing may be determined according to, for example, a crystal structure and an orientation of the sacrificial layer. For example, the functional thin film 120 integrated by performing the post thermal annealing on the sacrificial layer and the main oxide thin film layer may be crystallized in a predetermined orientation according to a crystal orientation of the sacrificial layer before the post thermal annealing. In this case, the crystal orientation of the functional thin film 120 may not necessarily be the same as the crystal orientation of the sacrificial layer. For example, the functional thin film 120 may have substantially the same crystal lattice spacing as that of the sacrificial layer, but may be grown and crystallized in an orientation different from that of the sacrificial layer. In addition, since a metal ion radius of the sacrificial layer and a metal ion radius of the main oxide thin film layer are similar ($Ti^{4+}$ ion radius is 0.60 Å and $V^{4+}$ ion radius is 0.58 Å), metal ions in the sacrificial layer may self-diffuse without actually deforming the crystalline structure of $VO_2$ during the post thermal annealing.

In the functional thin film 120, when R1 is a resistance at a temperature of 25° C. and R2 is a resistance at a temperature of 80° C., R1/R2 may be $10^4$ or more. An R1/R2 of the functional thin film 120 may be, for example, 17000 or more. By implementing the R1/R2 of the functional thin film 120 to be $10^4$ or more, the electronic component 1000 according to the present embodiment may more sensitively detect an energy variation at a temperature ranging from 25° C. to 80° C.

When a heating process from 25° C. to 80° C. and a cooling process from 80° C. to 25° C. are referred to as one cycle, the functional thin film 120 may satisfy at least one among a) a variation VΔT in hysteresis temperature difference ΔT during 10 cycles is 1° C. or lower, b) a variation $V_{TMI}$ in phase transition temperature $T_{MI}$ during 10 cycles is 1.5° C. or lower, and c) a variation rate $V_{R1/R2}$ of R1/R2 during 10 cycles is 5% or less.

Here, based on any one cycle, when a temperature at which an absolute value of a temperature coefficient of resistance (TCR) of the functional thin film 120 defined by the following Equation 1 is maximum during the heating process is $T_H$, and when a temperature at which an absolute value of the TCR of the functional thin film 120 defined by the following Equation 1 is maximum during the cooling process is $T_C$, the hysteresis temperature difference ΔT of the functional thin film 120 may be a difference between $T_H$ and $T_C$. The hysteresis temperature difference ΔT of the functional thin film 120 may be 1° C. or lower, for example, 0.726° C. or lower. When the hysteresis temperature difference ΔT of the functional thin film 120 is 1° C. or lower, the functional thin film 120 may be regarded as having substantially no thermal hysteresis during a corresponding cycle. As a result, in the functional thin film 120, a temperature during the heating process and a temperature during the cooling process may be substantially the same for the same resistance within the temperature range of the heating and cooling process. Therefore, unlike a typical electronic component whose temperature varies according to the heating process or the cooling process even at the same resistance, the electronic component 1000 according to the present embodiment may relatively accurately detect an energy variation.

$$TCR(/^\circ C.) = -(1/R)*(dR/dT) \qquad \text{[Equation 1]}$$

In addition, for example, when the heating process and the cooling process are performed on the functional thin film 120 from a $1^{st}$ cycle to a $10^{th}$ cycle, the variation $V_{\Delta T}$ in hysteresis temperature difference ΔT during 10 cycles of the functional thin film 120 may be a difference between maximum values and minimum values among hysteresis temperature differences ΔT1, ΔT2, . . . , ΔT10 of the functional thin film 120, which are obtained from the $1^{st}$ cycle to the $10^{th}$ cycle ($V_{\Delta T}$=| Max(Δ1, Δ2, . . . , Δ10)−Min(Δ1, Δ2, . . . , Δ10)|). Alternatively, for example, when the heating process and the cooling process are performed on the functional thin film 120 from the $1^{st}$ cycle to the $10^{th}$ cycle, the variation $V_{\Delta T}$ in hysteresis temperature difference ΔT during 10 cycles of the functional thin film 120 may be a difference between the hysteresis temperature difference ΔT1 of the functional thin film 120 during the $1^{st}$ cycle and the hysteresis temperature difference ΔT10 of functional thin film 120 during the $10^{th}$ cycle ($V_{\Delta T}$=| ΔT1-ΔT10|). When the variation $V_{\Delta T}$ in hysteresis temperature difference ΔT during 10 cycles of the functional thin film 120 is 1° C. or lower, the functional thin film 120 may be regarded as having a substantially constant hysteresis temperature difference ΔT even when the cycle increases. As a result, the functional thin film 120 may accurately detect energy variations repeatedly and stably within the temperature range of the heating process and the cooling process. Therefore, the electronic component 1000 according to the present embodiment may have improved repeatability with respect to accuracy.

Here, the phase transition temperature $T_{MI}$ of the functional thin film 120 may be defined by the following Equation 2. That is, the phase transition temperature $T_{MI}$ of the functional thin film 120 may be half of a difference between $T_H$ and $T_C$ during any one cycle. The phase transition temperature $T_{MI}$ of the functional thin film 120 may be 54° C. or lower, for example, 52.4° C., 53.1° C., or 53.5° C., but the scope of the present invention is not limited thereto. Specifically, the phase transition temperature $T_{MI}$ of the functional thin film 120 may vary according to the content of Ti ions doped in the functional thin film 120. When the phase transition temperature $T_{MI}$ of the functional thin film 120 is 54° C. or lower, a metal-insulator transition (MIT) phenomenon may be used in a relatively low temperature region. Therefore, the electronic component 1000 according to the present embodiment may be used as a switching component in a relatively low temperature region.

$$T_{MI}(^\circ C.) = |T_H - T_C|/2 \qquad \text{[Equation 2]}$$

In addition, for example, when the heating process and the cooling process are performed on the functional thin film 120 from the $1^{st}$ cycle to the $10^{th}$ cycle, a variation $V_{TMI}$ in phase transition temperature $T_{MI}$ of the functional thin film 120 during 10 cycles may be a difference between a maximum value and a minimum value among phase transition temperatures $T_{MI1}$, $T_{MI2}$, . . . , $T_{MI10}$ of the functional thin film 120 obtained during the first to $10^{th}$ cycles ($V_{TMI}$=| Max($T_{MI1}$, $T_{MI2}$, . . . , $T_{MI10}$)-Min($T_{MI1}$, $T_{MI2}$, . . . , $T_{MI10}$)|).

Alternatively, for example, when the heating process and the cooling process are performed on the functional thin film 120 from the $1^{st}$ cycle . . . to the $10^{th}$ cycle, a variation $V_{TMI}$ in phase transition temperature $T_{MI}$ of the functional thin film 120 during 10 cycles may be a difference between a phase transition temperature $T_{MI}$ of the functional thin film 120 during the $1^{st}$ cycle and a phase transition temperature $T_{MI1}$ of the functional thin film 120 during the $10^{th}$ cycle ($V_{TMI}$=|$T_{MI1}$−$T_{MI10}$|). When the variation $V_{TMI}$ in phase transition temperature $T_{MI}$ of the functional thin film 120 during 10 cycles is 1.5° C. or lower, the functional thin film 120 may be regarded as having a substantially constant phase transition temperature $T_{MI}$ even when the cycle increases. As a result, the functional thin film 120 may implement a switching function repeatedly and stably within the temperature range of the heating process and the cooling process. Therefore, the electronic component 1000 according to the present embodiment may be repeatedly used as a switching component in a relatively low temperature region, regardless of the number of operations.

Here, for example, when the heating process and the cooling process are performed on the functional thin film 120 from the $1^{st}$ cycle to the $10^{th}$ cycle, a variation rate $V_{R1/R2}$ of R1/R2 of the functional thin film 120 during 10 cycles may be a percentage obtained by dividing a difference between a maximum value and a minimum value among R1/R2 values $(R1/R2)_1$, $(R1/R2)_2$ . . . , $(R1/R2)_{10}$ of the functional thin film 120 obtained during the $1^{st}$ cycle to the $10^{th}$ cycle by the maximum value ($V_{R1/R2}$=100*|(Max($(R1/R2)_1$, $(R1/R2)_2$ . . . , $(R1/R2)_{10}$)−Min($(R1/R2)_1$, $(R1/R2)_2$ . . . , $(R1/R2)_{10}$)|)/Max($(R1/R2)_1$, $(R1/R2)_2$ . . . , $(R1/R2)_{10}$)). Here, for example, when the heating process and the cooling process are performed on the functional thin film 120 from the $1^{st}$ cycle to the $10^{th}$ cycle, the variation rate $V_{R1/R2}$ of R1/R2 of the functional thin film 120 during 10 cycles may be a percentage of a difference between the R1/R2 value $(R1/R2)_1$ of the functional thin film 120 during the $1^{st}$ cycle and the R1/R2 value $(R1/R2)_{10}$ of the functional thin film 120 during the $10^{th}$ cycle, with respect to the R1/R2 value $(R1/R2)_1$ of the functional thin film 120 during the 1 st cycle ($V_{R1/R2}$=100*(|$(R1/R2)_1$−$(R1/R2)_{10}$|)/$(R1/R2)_1$). When a variation rate $V_{R1/R2}$ of R1/R2 of the functional thin film 120 during 10 cycles is 5% or less, the functional thin film 120 may be regarded as having a substantially constant R1/R2 value even when the cycle increases. As a result, the functional thin film 120 may sensitively detect energy variations repeatedly and stably within the temperature range of the heating process and the cooling process. Therefore, the electronic component 1000 according to the present embodiment may have improved repeatability with respect to sensitivity.

The outer electrodes 200 and 300 are disposed to be spaced apart from each other on the body 100. That is, the outer electrodes 200 and 300 are disposed to be spaced apart from each other on the base substrate 110 and/or the functional thin film 120. Each of the outer electrodes 200 and 300 is in contact with and connected to the functional thin film 120. The outer electrodes 200 and 300 may each be formed by at least one among a vapor deposition method such as sputtering, a plating method, and a method of applying and curing a conductive paste. The outer electrodes 200 and 300 may each include a conductive material such as platinum (Pt), gold (Au), chromium (Cr), molybdenum (Mo), nickel (Ni), titanium (Ti), silver (Ag), aluminum (Al), copper (Cu), iron (Fe), indium (In), tin (Sn), lead (Pb), palladium (Pd), zinc (Zn), and cobalt (Co) or an alloy thereof. The outer electrodes 200 and 300 may each have a single-layer or multi-layer structure.

The outer electrodes 200 and 300 include conductive resin layers 210 and 310 and metal layers 220 and 320 formed on the conductive resin layers 210 and 310. Specifically, the first outer electrode 200 includes a first conductive resin layer 210 formed on the body 100 and a first metal layer 220 formed on the first conductive resin layer 210.

The second outer electrode 300 includes a second conductive resin layer 310 formed on the body 100 and a second metal layer 320.

The first conductive resin layer 210 is disposed on the first surface 101 of the body 100 and extends to at least a portion of each of the third to sixth surfaces 103, 104, 105, and 106 of the body 100. The first conductive resin layer 210 is in contact with one end portion of the first surface 101 of the body 100 of the functional thin film 120. The second conductive resin layer 310 is disposed on the second surface 102 of the body 100 and extends to at least a portion of each of the third to sixth surfaces 103, 104, 105, and 106 of the body 100. The second conductive resin layer 310 is in contact with the other end portion of the second surface 102 of the body 100 of the functional thin film 120. The first and second conductive resin layers 210 and 310 are disposed to be spaced apart from each other on each of the third to sixth surfaces 103, 104, 105, and 106 of the body 100. Meanwhile, in FIGS. 1 to 3, although each of the conductive resin layers 210 and 310 is shown as a normal type formed on five surfaces of the body 100, this is merely an example. That is, according to the design, each of the conductive resin layers 210 and 310 may be modified into one among a C type (for example, the first conductive resin layer 210 is disposed only on the first surface 101, the fifth surface 105, and the sixth surface 106 of the body 100), an L type (for example, the first conductive resin layer 210 is disposed only on first surface 101 and the fifth surface 105 of the body 100 or only on the first surface 101 and the sixth surface 106 of body 100), and a bottom electrode type (for example, the first conductive resin layer 210 is disposed only on the fifth surface 105 of the body 100).

Each of the conductive resin layers 210 and 310 includes a base resin R and conductive particles CP dispersed in the base resin R. The conductive particles CP are connected in contact with each other within the base resin R so that each of the outer electrodes 200 and 300 and the functional thin film 120 may be connected to each other. The conductive resin layers 210 and 310 may each be formed by applying a conductive paste for forming a conductive resin layer on the body 100 and then curing the conductive paste.

The base resin R may include a thermosetting resin having an electrical insulation property. The thermosetting resin may be, for example, an epoxy resin, but the present invention is not limited thereto.

The conductive particle CP may include at least one among Pt, Au, Cr, Mo, Ni, Ti, Ag, Al, Cu, Fe, In, Sn, Pb, Pd, Zn, and Co. As a non-limiting example, the conductive particle CP may include at least one among a Pt particle, an Au particle, a Cr particle, a Mo particle, an Ni particle, a Ti particle, a Ag particle, an Al particle, a Cu, an Fe particle, an In particle, an Sn particle, a Pb particle, a Pd particle, a Zn particle, a Co particle, and an alloy particle made of at least two among the above metals. As another example, the conductive particle CP may have a core-shell structure. Here, the core may include at least one among Pt, Au, Cr, Mo, Ni, Ti, Ag, Al, Cu, Fe, In, Sn, Pb, Pd, Zn, and Co, and the shell may include at least another one among Pt, Au, Cr, Mo, Ni, Ti, Ag, Al, Cu, Fe, In, Sn, Pb, Pd, Zn, and Co.

The conductive particle CP may have a spherical shape and/or a flake shape. The flake shape may be a shape in which a dimension in any one of the first to third directions 1, 2, and 3 is greater than 1.5 times or more a dimension in another one of the first to third directions 1, 2, and 3. Here, a direction of the larger dimension of the above two dimensions may be defined as a major axis, and a direction of the smaller dimension thereof may be defined as a minor axis.

The metal layers 220 and 320 may be formed on the conductive resin layers 210 and 310. At least a portion of each of the metal layers 220 and 320 is disposed in a region where a mounting surface of the electronic component 1000 according to the present embodiment is formed among the conductive resin layers 210 and 320.

For example, when the mounting surface of the electronic component 1000 according to the present embodiment is the fifth surface 105 of the body 100, the first metal layer 220 may be formed in a region disposed on the fifth surface 105 of the body 100 of the first conductive resin layer 210, and the second metal layer 320 may be formed in a region disposed on the fifth surface 105 of the body 100 of the second conductive resin layer 310. In this case, the first metal layer 220 may be formed on at least some of the first surface 101, the third surface 103, the fourth surface 104, and the sixth surface 106 of the body 100. Alternatively, even when the first conductive resin layer 210 has a shape extending to the first surface 101, the third surface 103, the fourth surface 104, and the sixth surface 106 of the body 100, the first metal layer 220 may not be formed on at least some of the first surface 101, the third surface 103, the fourth surface 104, and the sixth surface 106 of the body 100. In this case, the second metal layer 320 may be formed on at least some of the second surface 102, the third surface 103, the fourth surface 104, and the sixth surface 106 of the body 100. Alternatively, even when the second conductive resin layer 310 has a shape extending to the second surface 102, the third surface 103, the fourth surface 104, and the sixth surface 106 of the body 100, the second metal layer 320 may not be formed on at least some of the second surface 102, the third surface 103, the fourth surface 104, and the sixth surface 106 of the body 100.

As another example, when the mounting surface of the electronic component 1000 according to the present embodiment is the sixth surface 106 of the body 100, the first metal layer 220 may be formed in a region disposed on the sixth surface 106 of the body 100 of the first conductive resin layer 210, and the second metal layer 320 may be formed in a region disposed on the sixth surface 106 of the body 100 of the second conductive resin layer 310. In this case, the first metal layer 220 may be formed on at least some of the first surface 101 and the third to fifth surfaces 103, 104, and 105 of the body 100. Alternatively, even when the first conductive resin layer 210 has a shape extending to the first surface 101 and the third to fifth surfaces 103, 104, and 105 of the body 100, the first metal layer 220 may not be formed on at least some of the first surface 101 and the third to fifth surfaces 103, 104, and 105 of the body 100. In this case, the second metal layer 320 may be formed on at least some of the second to fifth surfaces 102, 103, 104, and 105 of the body 100. Alternatively, even when the second conductive resin layer 310 has a shape extending to the second to fifth surfaces 102, 103, 104, and 105 of the body 100, the second metal layer 320 may not be formed on at least some of the second to fifth surfaces 102, 103, 104, and 105 of the body 100.

The metal layers 220 and 320 may each include at least one among Pt, Au, Cr, Mo, Ni, Ti, Ag, Al, Cu, Fe, In, Sn, Pb, Pd, Zn, and Co.

The metal layers 220 and 320 may each be formed as a single layer or as a multi-layer. The metal layers 220 and 320 may each be formed by at least one of a deposition method such as sputtering and a plating method. As a non-limiting example, the metal layers 220 and 320 may include first plating layers 221 and 321 formed on the conductive resin layers 210 and 310, and second plating layers 222 and 322 formed on the first plating layers 221 and 321. As a non-limiting example, the first plating layers 221 and 321 may each be an Ni plating layer, and the second plating layers 222 and 322 may each be an Sn plating layer. Meanwhile, for example, on the first to sixth surfaces 101, 102, 103, 104, 105, and 106 of the body 100, when a region where the conductive resin layers 210 and 310 are formed and a region where the metal layers 220 and 320 are formed are different from each other, a process of forming a resist exposing only portions of outer surfaces of the conductive resin layers 210 and 310 may be added between the process of forming the conductive resin layers 210 and 310 and the process of forming the metal layers 220 and 320.

EXPERIMENTAL EXAMPLES

Method of Manufacturing Experimental Examples 1 and 2

Experimental Example 1 was manufactured by the following method. First, a $TiO_2$ thin film (thickness ranging from 3 nm to 5 nm) was formed as a sacrificial layer on a sapphire ($Al_2O_3$) single crystal substrate through a sputtering process. Next, a $VO_2$ thin film (thickness ranging from 200 nm to 300 nm) was formed as a main oxide thin film layer on the sacrificial layer through a sputtering process. In order to form the $VO_2$ thin film, deposition was performed by setting a process temperature to room temperature and a process pressure to a range of 10 mTorr to 30 mTorr, and supplying Ar gas. Next, by performing post thermal annealing on the sacrificial layer and the main oxide thin film layer at a temperature ranging from 400° C. to 800° C., a functional thin film in which at least some of the V ions in $VO_2$ crystal lattices were substituted (doped) with Ti ions was manufactured. Hereinafter, the finally manufactured functional thin film according to Experimental Example 1 is referred to as a first thin film.

When compared to Experimental Example 1, Experimental Example 2 was manufactured in the same manner as Experimental Example 1, except that the sacrificial layer of Experimental Example 1 was not deposited. That is, in Experimental Example 2, a main oxide thin film layer ($VO_2$) was formed directly on the sapphire ($Al_2O_3$) single crystal substrate used in Experimental Example 1 under the same conditions as the deposition conditions of the main oxide thin film layer of Experimental Example 1, and then post thermal annealing was performed on the main oxide thin film layer under the same conditions as the post thermal annealing conditions of Experimental Example 1. Hereinafter, the finally manufactured thin film (the main oxide thin film layer subjected to post thermal annealing) according to Experimental Example 2 is referred to as a second thin film.

Evaluation of Characteristics of First and Second Thin Film for Thermal Cycle The resistance of each of the first and second thin films according to a temperature was measured by performing a plurality of thermal cycles consisting of a heating process from 25° C. to 80° C. and a cooling process from 80° C. to 25° C.

The heating and cooling of the first and second thin films were implemented by installing a heater capable of generating heat below the sapphire substrate on which each of the first and second thin films was formed and adjusting the power applied to the heater. Specifically, the first and second thin films were heated by supplying power to the heater at room temperature (25° C.), and when the temperature of each of the first and second thin films reached 80° C., the power applied to the heater was cut off to cool the first and second thin films.

The surface temperatures of the first and second thin films were measured using a KEITHLEY 2182A nanovoltmeter by attaching a contact temperature measuring probe (k-type thermocouple and 0.005 inch thermocouple wire) of Omega Engineering Inc. to the first and second thin films.

The electrical resistance of each of the first and second thin films was derived by applying a constant voltage to the first and second thin films using a KEITHLEY 2400 as a source meter, measuring a current of each of the first and second thin films at that voltage, and converting the measured current into electrical resistance (R=V/I). In this case, in order to reduce the contact resistance between each of the first and second thin films, and the metal probe for measuring a current, a metal thin film having a thickness of 100 nm was formed on some regions of the first and second thin films, and the current was measured by contacting the metal thin film with the metal probe.

Figure 5:
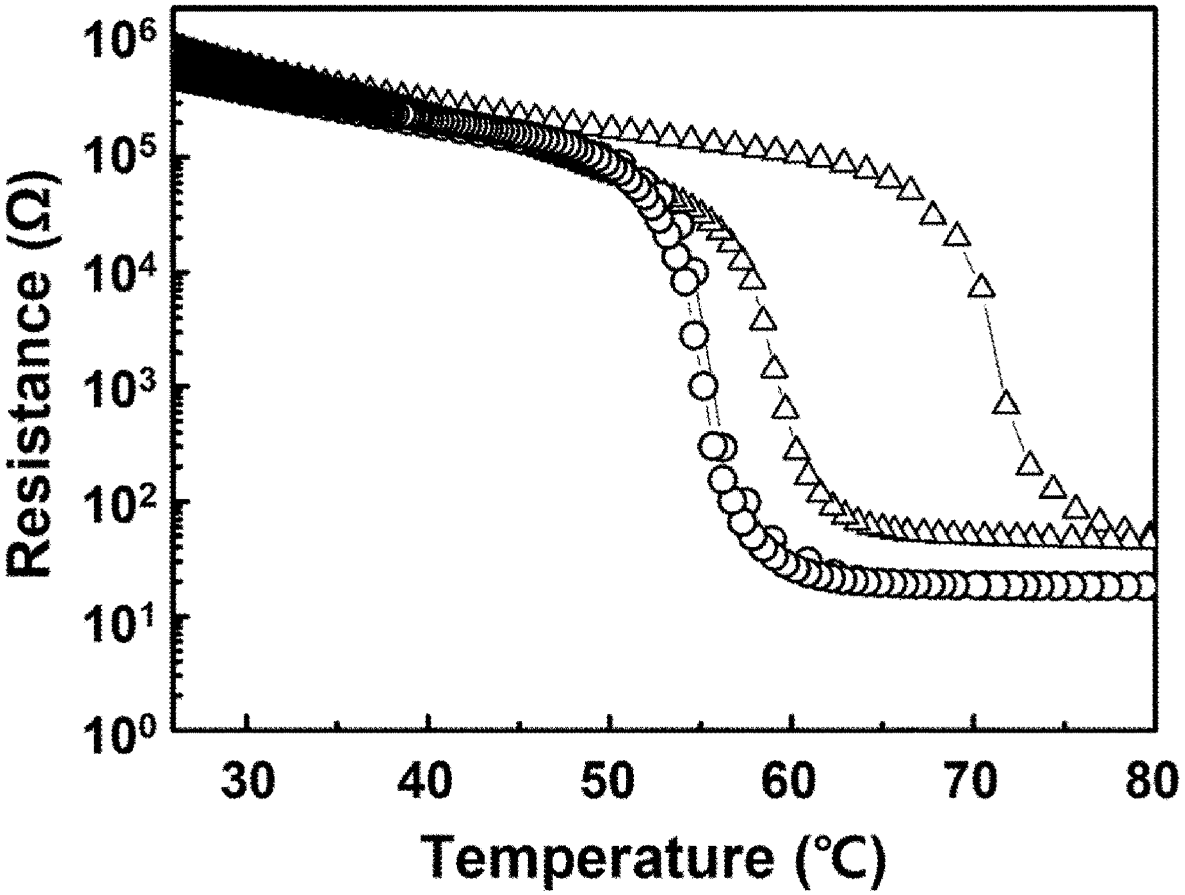
FIG. 5 is a graph showing resistance according to temperatures during a $1^{st}$ cycle of Experimental Examples 1 and 2.
Figure 6:
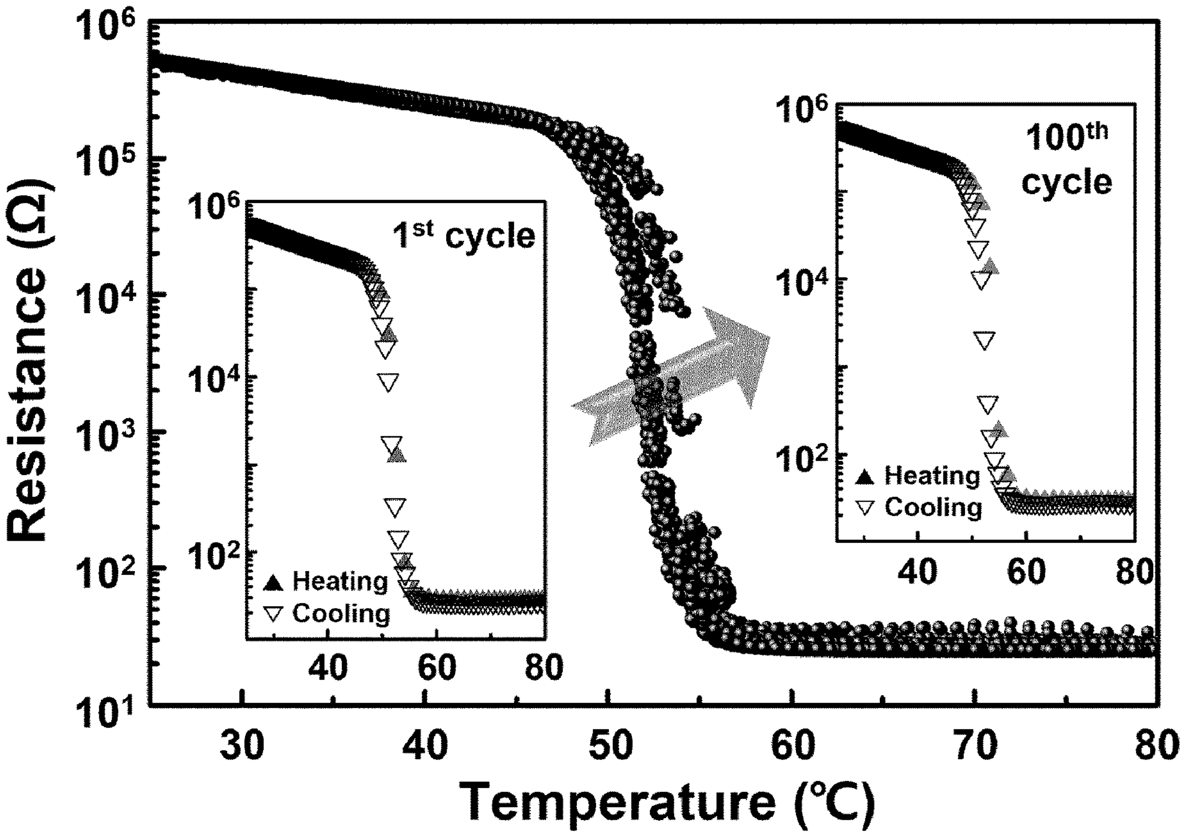
FIG. 6 is a graph showing resistance according to temperatures during multiple cycles of Experimental Example 1.
Figure 7:
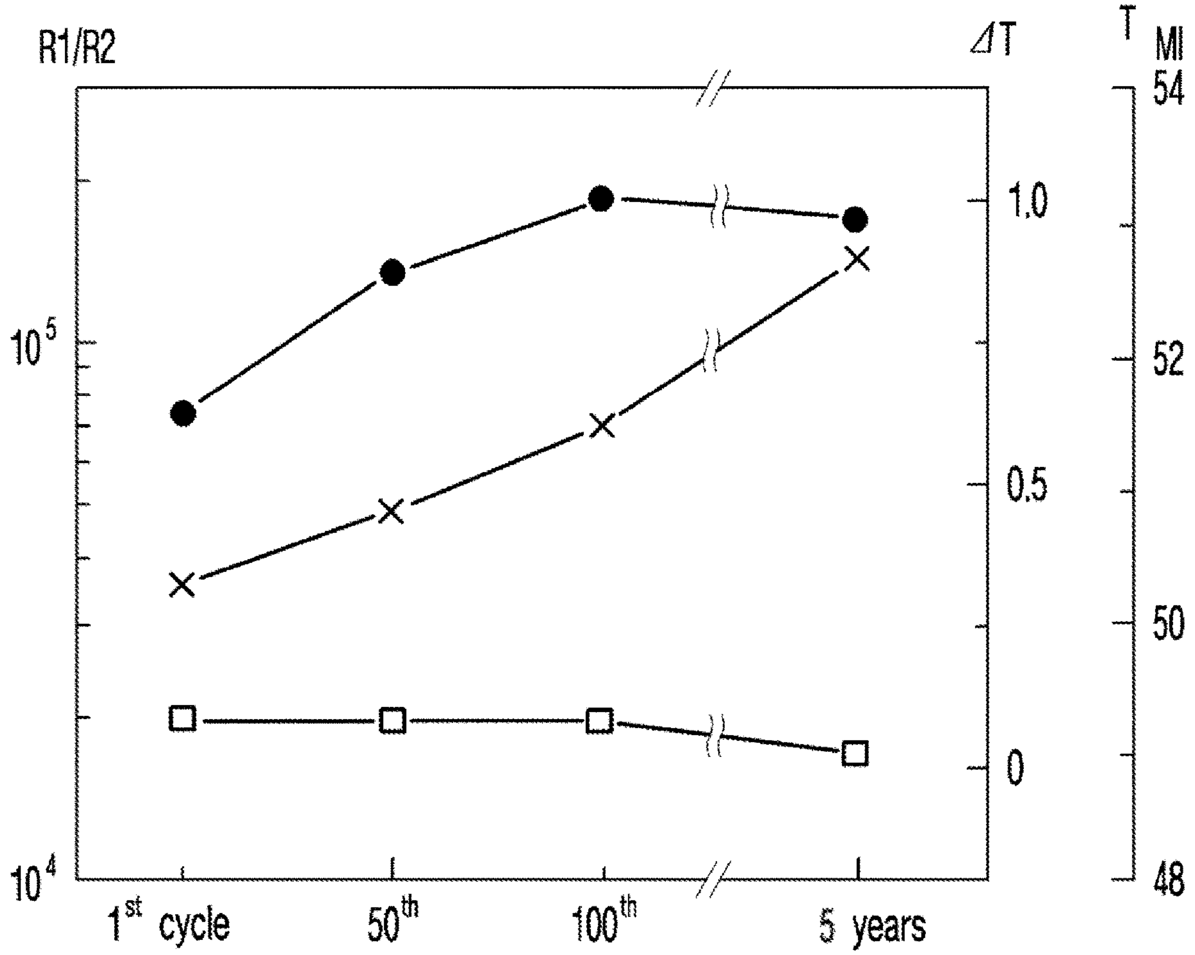
FIG. 7 is a graph showing variations in R1/R2, a hysteresis temperature difference (ΔT), and a phase transition temperature ($T_{MI}$) of Experimental Example 1 according to accumulation of thermal cycles.

The resistance of each of the first and second thin films according to temperature during the $1^{st}$ cycle is shown in FIG. 5. In FIG. 5, the first thin film is indicated by "○" and the second thin film is indicated by "Δ." The resistance of the first thin film according to temperature during a plurality of cycles is shown in FIG. 6. FIG. 7 is a graph in which an X-axis represents the number of thermal cycles and a Y-axis represents R1/R2 of the first thin film, the hysteresis temperature difference ΔT, and the phase transition temperature $T_{MI}$. In FIG. 7, "a" denotes R1/R2, "X" denotes the hysteresis temperature difference ΔT (units: ° C.), and "•" denotes the phase transition temperature $T_{MI}$ (units: ° C.).

Based on FIG. 5, during the $1^{st}$ cycle, resistance R1 at a temperature of 25° C., resistance R2 at a temperature of 80° C., a temperature $T_H$ at which an absolute value of a TCR is maximum during the heating process, a temperature $T_C$ at which an absolute value of the TCR is maximum during the cooling process, R1/R2, a hysteresis temperature difference ΔT, a phase transition temperature $T_{MI}$ of each of the first and second films are shown in Table 1.

TABLE 1

| | R1 (Ω) | R2 (Ω) | $T_H$ (° C.) | $T_C$ (° C.) | R1/ R2 | ΔT (° C.) | $T_{MI}$ (° C.) |
|---|---|---|---|---|---|---|---|
| #1 | $5.257 * 10^5$ | $2.631 * 10^2$ | 52.427 | 52.370 | 19981 | 0.043 | 52.40 |
| #2 | $1.013 * 10^6$ | $4.653 * 10^2$ | 70.445 | 59.035 | 21778 | 11.41 | 64.74 |

Referring to Table 1, the R1/R2 of the first and second thin films are 19981 and 21778, respectively, which are $10^4$ or more. Considering that a ratio of the resistance at a temperature of 25° C. to the resistance at a temperature of 80° C. of a typical temperature-sensitive resistive layer is tens to hundreds, variations in resistance of the first and second thin films in the same temperature range are relatively large compared to a variation in resistance of the typical temperature-sensitive resistive layer. Therefore, the electronic component using the first and second thin films may detect the temperature more sensitively than an electronic component using the typical temperature-sensitive resistance layer.

Referring to Table 1, as the second thin film has a hysteresis temperature difference ΔT of 11.41° C., hysteresis temperature difference ΔT exceeds 1° C. As the first thin film has a hysteresis temperature difference ΔT of 0.043° C., the hysteresis temperature difference ΔT is 1° C. or lower. This means that a difference between the temperature during the heating process and the temperature during the cooling process for the same resistance is relatively large in the second thin film and is relatively small in the first thin film. Therefore, the electronic component using the first thin film may detect the temperature more accurately than the electronic component using the second thin film.

Referring to Table 1 and FIG. 5, it can be seen that the maximum value of the TCR of the first thin film is greater than the maximum value of the TCR of the second thin film. This indicates that the first thin film has a large resistance variation according to the temperature variation compared to the second thin film. Therefore, sensitivity to temperature variations near the phase transition temperature $T_{MI}$ of the first thin film may be higher than sensitivity to temperature variations near the phase transition temperature $T_{MI}$ of the second thin film.

Referring to Table 1, the phase transition temperature $T_{MI}$ of the first thin film is relatively lower than the phase transition temperature $T_{MI}$ of the second thin film. This means that the first thin film transitions from an insulator to a conductor at a relatively low temperature compared to the second thin film (MIT). Therefore, the electronic component using the first thin film may be used as a switching component at a relatively low temperature compared to the electronic component using the second thin film.

Based on FIGS. 6 and 7, during each cycle of the first thin film, R1/R2, the hysteresis temperature difference ΔT, the phase transition temperature $T_{MI}$, the variation $V_{\Delta T}$ in hysteresis temperature difference ΔT during 10 cycles, the variation $V_{TMI}$ in phase transition temperature $T_{MI}$ during 10 cycles, and the variation rate $V_{R1/R2}$ during 10 cycles are shown in Table 2.

Meanwhile, in Table 2, for example, based on a section from the $1^{st}$ cycle to the $10^{th}$ cycle, the variation $V_{\Delta T}$ in hysteresis temperature difference ΔT during 10 cycles may be a difference between the hysteresis temperature difference ΔT1 of the $1^{st}$ cycle, which is the initial cycle of the corresponding section, and the hysteresis temperature difference ΔT10 of the $10^{th}$ cycle, which is the last cycle of the corresponding section ($V_{\Delta T}=|\Delta T1-\Delta T10|$). This also applies to the variation $V_{TMI}$ in phase transition temperature $T_{MI}$ during 10 cycles. In addition, in Table 2, for example, based on the section from the $1^{st}$ cycle to the $10^{th}$ cycle, the variation rate $V_{R1/R2}$ of R1/R2 during 10 cycles may be a percentage of a difference between the R1/R2 value $(R1/R2)_1$ of the 1st cycle, which is the initial cycle of the corresponding section, and the R1/R2 value $(R1/R2)_{10}$ of the $10^{th}$ cycle, which is the last cycle of the corresponding section, with respect to the R1/R2 value $(R1/R2)_1$ of the $1^{st}$ cycle, which is the initial cycle of the corresponding section $$\left(V_{R1/R2} = 100 * \left(\left|(R1/R2)_1 - (R1/R2)_{10}\right|\right) / (R1/R2)_1\right).$$

In addition, in Table 2, a section from the $1^{st}$ cycle to the $10^{th}$ cycle is a first section, a section from the $11^{th}$ cycle to the $20^{th}$ cycle is a second section, a section from the $21^{st}$ cycle to the $30^{th}$ cycle is a third section, a section from the $31^{st}$ cycle to the $40^{th}$ cycle is a fourth section, and a section from the $41^{st}$ cycle to the $50^{th}$ cycle is a fifth section.

TABLE 2

| | R1/R2 | ΔT (° C.) | $T_{MI}$ (° C.) | $V_{\Delta T}$ (° C.) | $V_{TMI}$ (° C.) | $V_{R1/R2}$ (%) |
|---|---|---|---|---|---|---|
| $1^{st}$ | 19981 | 0.043 | 52.40 | — | — | — |
| $10^{th}$ | 19849 | 0.347 | 52.54 | 0.304 | 0.14 | 0.66 |
| $11^{th}$ | 19754 | 0.349 | 52.50 | — | — | — |
| $20^{th}$ | 19811 | 0.100 | 52.70 | 0.249 | 0.249 | 0.29 |
| $21^{st}$ | 19798 | 0.162 | 52.32 | — | — | — |
| $30^{th}$ | 19706 | 0.492 | 52.75 | 0.330 | 0.43 | 0.46 |
| $31^{st}$ | 19620 | 0.569 | 52.15 | — | — | — |
| $40^{th}$ | 19785 | 0.372 | 52.71 | 0.197 | 0.56 | 0.84 |
| $41^{st}$ | 19906 | 0.220 | 52.53 | — | — | — |
| $50^{th}$ | 19650 | 0.456 | 53.13 | 0.236 | 0.60 | 1.28 |
| $100^{th}$ | 19714 | 0.636 | 53.46 | — | — | — |

Referring to Table 2, the variation $V_{\Delta T}$ in hysteresis temperature difference ΔT of the first thin film during 10 cycles is 0.304° C. in the first section, 0.249° C. in the second section, 0.330° C. in the third section, 0.197° C. in the fourth section, and 0.236° C. in the fifth section. That is, since the variation $V_{\Delta T}$ in hysteresis temperature difference ΔT of the first thin film is 1° C. or lower during 10 cycles in all of the first to fifth sections, the first thin film may be regarded as having a substantially constant hysteresis temperature difference ΔT regardless of which section. As a result, the first thin film may accurately detect energy variations repeatedly and stably within the temperature range of the heating process and the cooling process.

Referring to Table 2, the variation $V_{TMI}$ in phase transition temperature $T_{MI}$ of the first thin film during 10 cycles is 0.14° C. in the first section, 0.249° C. in the second section, 0.43° C. in the third section, 0.56° C. in the fourth section, and 0.60° C. in the fifth section. That is, since the variation $V_{TMI}$ in phase transition temperature $T_{MI}$ of the first thin film is 1° C. or lower during 10 cycles in all of the first to fifth sections, the first thin film may be regarded as having a substantially constant phase transition temperature $T_{MI}$ regardless of which section. As a result, the first thin film may exhibit a switching function repeatedly and stably at substantially the same temperature within the temperature range of the heating process and the cooling process.

Referring to Table 2, the variation rate $V_{R1/R2}$ of R1/R2 of the first thin film during 10 cycles is 0.66% in the first section, 0.29% in the second section, and 0.46% in the third section, 0.84% in the fourth section, and 1.28% in the fifth section. That is, since the variation rate $V_{R1/R2}$ of R1/R2 of the first thin film is 1° C. or lower during 10 cycles in all of the first to fifth sections, the first thin film may be regarded as having a substantially constant R1/R2 value regardless of which section. As a result, the first thin film 120 may sensitively detect energy variations repeatedly and stably within the temperature range of the heating process and the cooling process.

Meanwhile, as described above, based on the first to fifth sections, that is, the 1st to 50th cycles, the variation rate $V_{R1/R2}$ of R1/R2 of the first thin film during 10 cycles, the variation $V_{\Delta T}$ in hysteresis temperature difference ΔT of the first thin film during 10 cycles, and the variation $V_{TMI}$ in phase transition temperature $T_{MI}$ of the first thin film during 10 cycles are described, but this is merely an example, and the scope of the present invention is not limited thereto. That is, referring to FIG. 7, when the first thin film is within the 1st to 50th cycles, even during any 10 cycles other than each of the above-described first to fifth sections cycles (for example, 10 cycles consisting of the $3^{rd}$ cycle to the $12^{th}$ cycle), it can be seen that the first thin film has the above-described variation rate $V_{R1/R2}$ of R1/R2 during 10 cycles, the above-described variation $V_{\Delta T}$ in hysteresis temperature difference ΔT during 10 cycles, and the above-described variation $V_{TMI}$ in phase transition temperature $T_{MI}$ during 10 cycles. In addition, referring to FIG. 7, even during a cycle after the $50^{th}$ cycle, it can be seen that the first thin film has the above-described variation rate $V_{R1/R2}$ of R1/R2 during 10 cycles, the above-described variation $V_{\Delta T}$ in hysteresis temperature difference ΔT during 10 cycles, and the above-described variation $V_{TMI}$ in phase transition temperature $T_{MI}$ during 10 cycles.

Figure 8:
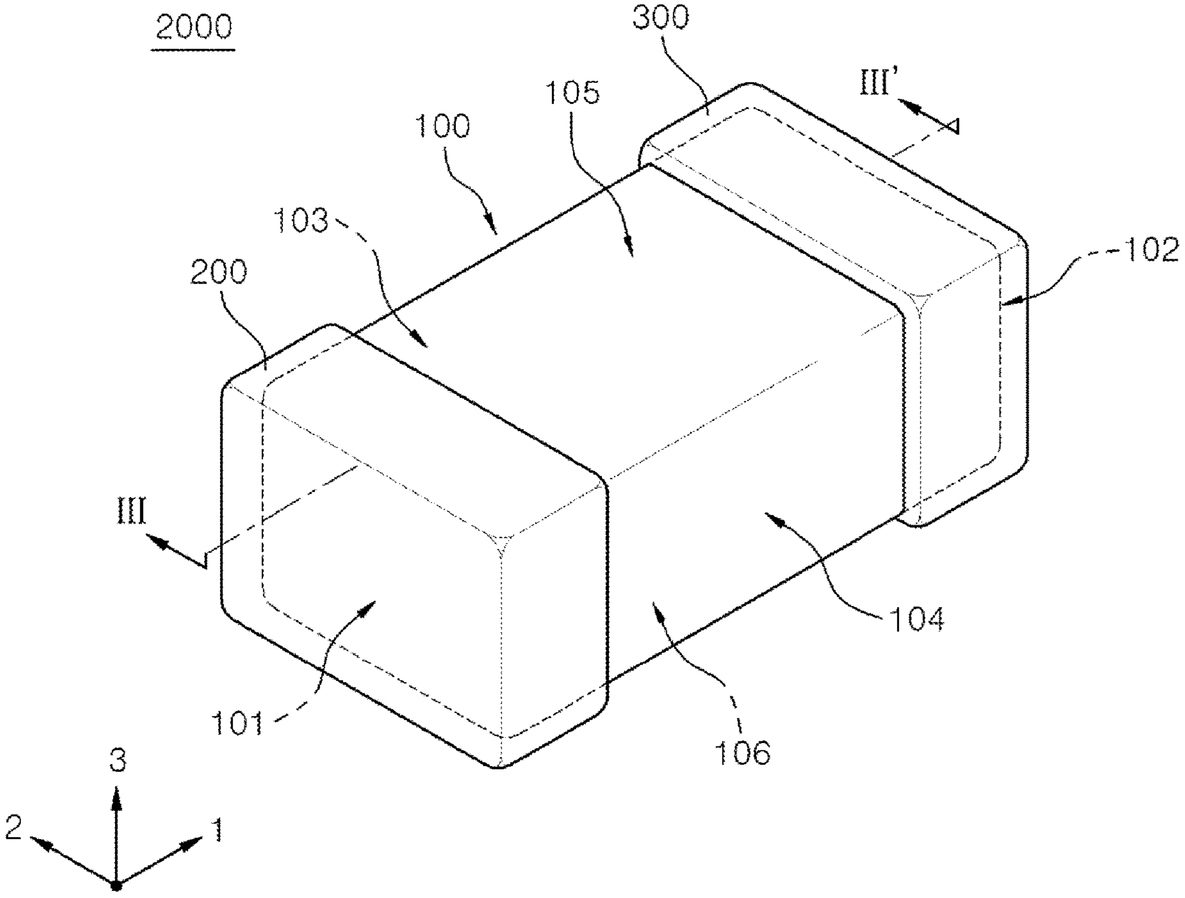
FIG. 8 is a schematic diagram illustrating an energy-sensitive electronic component according to another embodiment of the present invention.
Figure 9:
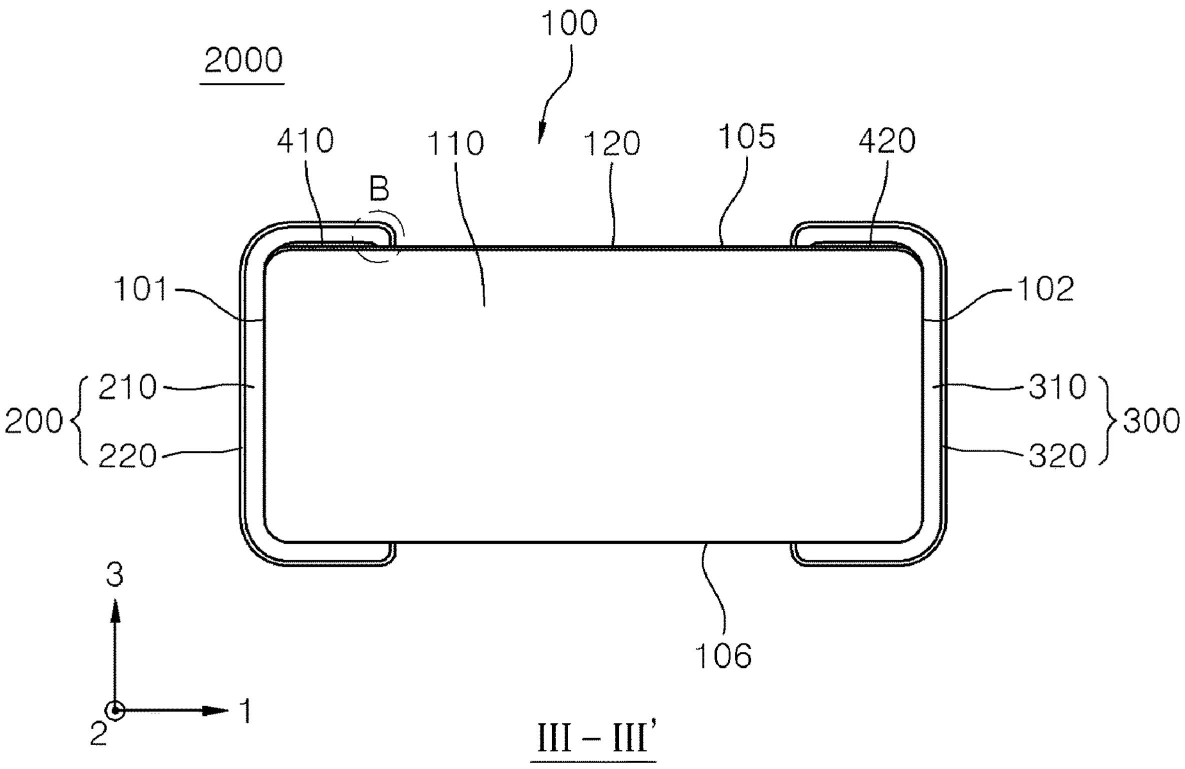
FIG. 9 is a cross-sectional view of the energy-sensitive electronic component along line III-III' of FIG. 8.
Figure 10:
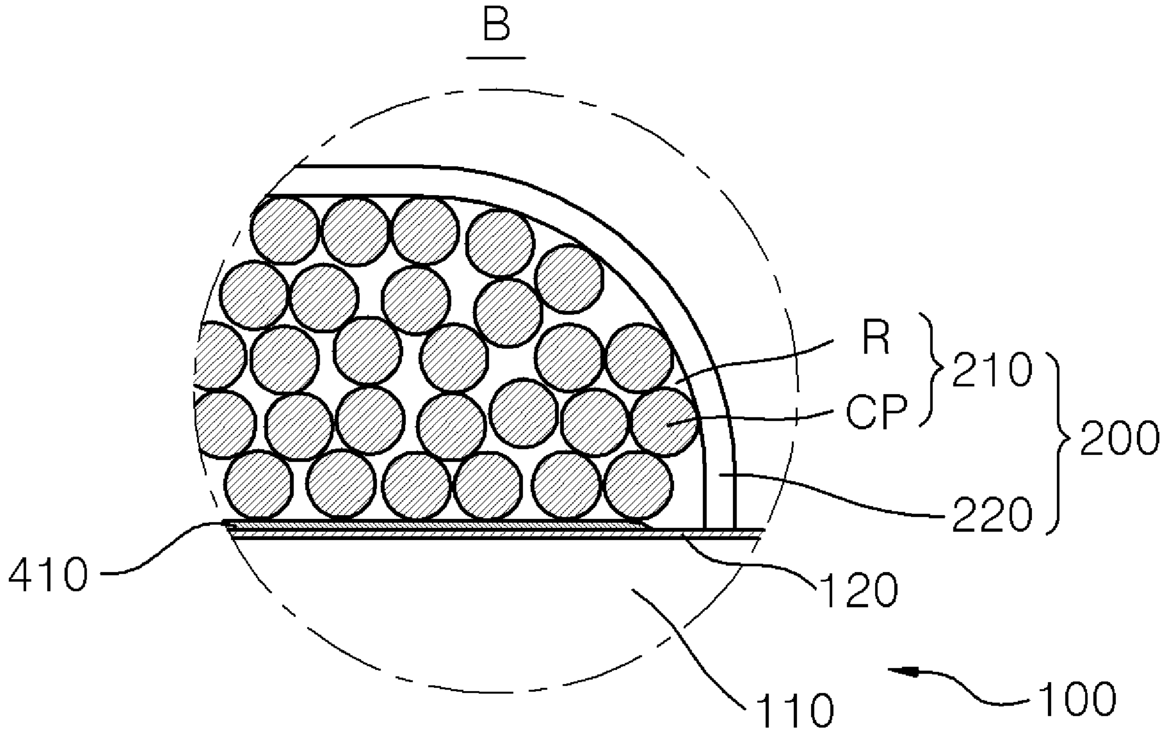
FIG. 10 is an enlarged view illustrating portion B of FIG. 9.

FIG. 8 is a schematic diagram illustrating an energy-sensitive electronic component according to another embodiment of the present invention. FIG. 9 is a cross-sectional view of the energy-sensitive electronic component along line III-III' of FIG. 8. FIG. 10 is an enlarged view illustrating portion B of FIG. 9.

Referring to FIGS. 1 to 4 and 8 to 10, an electronic component 2000 according to another embodiment of the present invention further includes lead thin films 410 and 420 compared to the electronic component 1000 according to one embodiment of the present invention. Therefore, in describing the present embodiment, only the lead thin films 410 and 420 and structures related thereto, which are different from one embodiment of the present invention, will be described. The description of one embodiment of the present invention may be directly applied to the remaining components of the present embodiment.

Referring to FIGS. 8 to 10, the lead thin films 410 and 420 are disposed between outer electrodes 200 and 300 and a functional thin film 120 to connect the outer electrodes 200 and 300 to the functional thin film 120. The functional thin film 120 has one surface in contact with a base substrate 110 (a lower surface of the functional thin film 120 based on the directions of FIGS. 8 to 10), and the other surface facing the one surface (a lower surface of the functional thin film 120 based on the directions of FIGS. 8 to 10, and the lead thin films 410 and 420 are disposed on the upper surface of the functional thin film 120.

The first lead thin film 410 is formed on a first surface 101 of a body 100 on the upper surface of the functional thin film 120 to be in contact with the functional thin film 120 and the first outer electrode 200. The second lead thin film 420 is formed on a second surface 102 of the body 100 on the upper surface of the functional thin film 120 to be in contact with the functional thin film 120 and the second outer electrode 200.

The lead thin films 410 and 420 may each include at least one among Pt, Au, Cr, Mo, Ni, Ti, Ag, Al, Cu, Fe, In, Sn, Pb, Pd, Zn, and Co. The lead thin films 410 and 420 may each have a single-layer or multi-layer structure. For example, the first lead thin film 410 may have a single layer structure composed of one among Pt, Au, Cr, Mo, Ni, Ti, Ag, Al, Cu, Fe, In, Sn, Pb, Pd, Zn, and Co. As another example, the first lead thin film 410 may have a multi-layer structure including a first thin film in contact with the functional thin film 120 and a second thin film disposed on the first thin film. The first thin film and the second thin film may include different metals among the above metals.

The lead thin films 410 and 420 may be formed through a thin film process such as a physical vapor deposition method such as sputtering, PLD, or electron beam deposition, and CVD including PECVD and MOCVD, ALD, or MBE. For example, the lead thin films 410 and 420 may be formed on the functional thin film 410 and 420 through sputtering using a mask with one open region.

A thickness of each of the lead thin films 410 and 420 may range, for example, 10 nm to 1000 nm. The thicknesses of the lead thin films 410 and 420 may be measured by at least one among, for example, a mechanical method using a probe, a microscopic method using an SEM, and an optical method using reflected light from the thin film.

Since the main component of the functional thin film 120 is $VO_2$, which is a metal oxide, when the outer electrodes 200 and 300, which are conductors, are formed directly on the functional thin film 120, a bonding force between the functional thin film 120 and the outer electrodes 200 and 300 may be weak. Thus, in the present embodiment, the lead thin films 410 and 420, which are thin metal layers, are formed between the functional thin film 120 and the outer electrodes 200 and 300 so that electrical and mechanical bonding forces between the functional thin film 120 and the outer electrodes 200 and 300 can be improved.

As described above, although the embodiments of the present invention have been described, those skilled in the art can make various modifications and changes in the present invention by adding, changing, or deleting components within the scope of the present invention without departing from the spirit of the present invention described in the appended claims, and these modifications and changes fall within the scope of the present invention.

The invention claimed is:

1. An energy-sensitive electronic component, comprising:

an $Al_2O_3$ single crystal base substrate;

a $VO_2$ functional thin film disposed on the $Al_2O_3$ single crystal base substrate and doped with Ti; and a first outer electrode and a second outer electrode disposed to be spaced apart from each other on the $Al_2O_3$ single crystal base substrate and/or the $VO_2$ functional thin film and connected to the $VO_2$ functional thin film, wherein, when R1 is a resistance at a temperature of 25° C. and R2 is a resistance at a temperature of 80° C., the $VO_2$ functional thin film has an R1/R2 of 104 or more, and when a heating process from 25° C. to 80° C. and a cooling process from 80° C. to 25° C. are referred to as one cycle, the $VO_2$ functional thin film satisfies all of a) a variation ($V_{\Delta T}$) in hysteresis temperature difference ($\Delta T$) during 10 cycles is 1° C. or lower, b) a variation ($V_{TMI}$) in phase transition temperature ($T_{MI}$) during 10 cycles is 1.5° C. or lower, and c) a variation rate ($V_{R1/R2}$) of R1/R2 during 10 cycles is 5% or less.

2. The energy-sensitive electronic component of claim 1, wherein each of the first outer electrode and the second outer electrode includes a conductive resin layer including a base resin and conductive particles dispersed in the base resin, and wherein the conductive particles include at least one of platinum (Pt), gold (Au), chromium (Cr), molybdenum (Mo), nickel (Ni), titanium (Ti), silver (Ag), aluminum (Al), copper (Cu), iron (Fe), indium (In), tin (Sn), lead (Pb), palladium (Pd), zinc (Zn), and cobalt (Co).

3. The energy-sensitive electronic component of claim 1, further comprising:

first and second lead thin films disposed between each of the first outer electrode and the second outer electrode and the $VO_2$ functional thin film to connect the first outer electrode and the second outer electrode to the $VO_2$ functional thin film.

4. The energy-sensitive electronic component of claim 3, wherein each of the first and second lead thin films includes at least one of Pt, Au, Cr, Mo, Ni, Ti, Ag, Al, Cu, Fe, In, Sn, Pb, Pd, Zn, and Co.

5. The energy-sensitive electronic component of claim 3, wherein the $VO_2$ functional thin film has one surface in contact with the $Al_2O_3$ single crystal base substrate and another surface facing the one surface, and the first and second lead thin films are disposed to be spaced apart from each other on the another surface of the $VO_2$ functional thin film.

6. The energy-sensitive electronic component of claim 5, wherein at least a portion of the first outer electrode and at least a portion of the second outer electrode are disposed to be spaced apart from each other on the another surface of the $VO_2$ functional thin film so as to be in contact with the first and second lead thin films.

7. The energy-sensitive electronic component of claim 6, wherein the first outer electrode and the second outer electrode extend to both end surfaces, which face each other, of the $Al_2O_3$ single crystal base substrate.

8. A thin-film substrate, comprising:

an $Al_2O_3$ single crystal base substrate;

and a $VO_2$ functional thin film disposed on the $Al_2O_3$ single crystal base substrate and doped with Ti, wherein, when R1 is a resistance at a temperature of 25° C. and R2 is a resistance at a temperature of 80° C., the $VO_2$ functional thin film has an R1/R2 of 104 or more, and when a heating process from 25° C. to 80° C. and a cooling process from 80° C. to 25° C. are referred to as one cycle, the $VO_2$ functional thin film satisfies all of a) a variation ($V_{\Delta T}$) in hysteresis temperature difference ($\Delta T$) during 10 cycles is 1° C. or lower, b) a variation ($V_{TMI}$) in phase transition temperature ($T_{MI}$) during 10 cycles is 1.5° C. or lower, and c) a variation rate ($V_{R1/R2}$) of R1/R2 during 10 cycles is 5% or less.

9. The thin-film substrate of claim 8, further comprising:

first and second lead thin films disposed to be spaced apart from each other on the $VO_2$ functional thin film and connected to the $VO_2$ functional thin film.

10. The thin-film substrate of claim 9, wherein each of the first and second lead thin films includes at least one of platinum (Pt), gold (Au), chromium (Cr), molybdenum (Mo), nickel (Ni), titanium (Ti), silver (Ag), aluminum (Al), copper (Cu), iron (Fe), indium (In), tin (Sn), lead (Pb), palladium (Pd), zinc (Zn), and cobalt (Co).

* * * * *